(12) United States Patent
Tollefson

(10) Patent No.: US 9,651,679 B1
(45) Date of Patent: May 16, 2017

(54) APPLICATION OF GPS SIGNAL PROCESSING TO ATTITUDE DETERMINATION AND COMMUNICATION

(75) Inventor: William G. Tollefson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 927 days.

(21) Appl. No.: 13/086,068

(22) Filed: Apr. 13, 2011

(51) Int. Cl.
| | |
|---|---|
| *G01S 19/53* | (2010.01) |
| *G01S 19/40* | (2010.01) |
| *G01S 5/02* | (2010.01) |
| *G01S 19/54* | (2010.01) |
| *G01S 19/55* | (2010.01) |

(52) U.S. Cl.
CPC ............ *G01S 19/53* (2013.01); *G01S 5/0247* (2013.01); *G01S 19/40* (2013.01); *G01S 19/54* (2013.01); *G01S 19/55* (2013.01)

(58) Field of Classification Search
CPC .......... G01S 19/53; G01S 19/54; G01S 19/55; G01S 19/00; G01S 19/40; G01S 5/0247
USPC ............ 342/357.73, 357.36, 357.37, 357.38, 342/357.2, 357.21, 357.23
See application file for complete search history.

(56) References Cited

U.S. PATENT DOCUMENTS

| | | | | |
|---|---|---|---|---|
| 5,506,588 | A * | 4/1996 | Diefes .................... | G01C 21/00 342/357.27 |
| 5,534,875 | A * | 7/1996 | Diefes et al. ............ | 342/357.59 |
| 5,790,071 | A * | 8/1998 | Silverstein ............. | H01Q 1/185 342/354 |
| 5,914,685 | A * | 6/1999 | Kozlov et al. ........... | 342/357.26 |
| 5,943,008 | A * | 8/1999 | Van Dusseldorp ............ | 701/470 |
| 6,300,898 | B1 * | 10/2001 | Schneider et al. ........ | 342/357.61 |
| 6,336,061 | B1 * | 1/2002 | Deines .................... | G01S 19/55 342/357.59 |
| 6,421,003 | B1 * | 7/2002 | Riley et al. ............. | 342/357.38 |
| 6,441,777 | B1 * | 8/2002 | McDonald ............... | G01S 19/44 342/357.31 |
| 6,598,009 | B2 * | 7/2003 | Yang ........................ | G01S 3/36 342/357.52 |
| 6,782,320 | B1 * | 8/2004 | Bahder ........................ | 701/468 |
| 6,992,624 | B2 * | 1/2006 | Feller ...................... | G01S 19/54 342/357.29 |
| 7,009,557 | B2 * | 3/2006 | Kirchofer et al. ............ | 342/359 |
| 7,372,400 | B2 * | 5/2008 | Cohen et al. ............ | 342/357.29 |

(Continued)

*Primary Examiner* — Chuong P Nguyen
(74) *Attorney, Agent, or Firm* — Angel N. Gerdzhikov; Donna P. Suchy; Daniel M. Barbieri

(57) ABSTRACT

The present invention is a method for dynamically determining attitude of a mobile platform via a system implemented on-board the platform. The method includes providing initialization data for the platform from a memory of the system to a processor of the system, the initialization data including platform position platform velocity data, and platform heading for a first point in time. The method includes receiving RF signals via an antenna array of the system at a second point in time subsequent to the first point in time. The method includes providing RF inputs including the received signals from the antenna array to a receiving unit of the system, and then from the receiving unit to a processor of the system. The processor then processes the signals and, based on the processed signals and initialization data, determines an attitude of the platform, the attitude corresponding to the second point in time.

21 Claims, 2 Drawing Sheets

(56) References Cited

U.S. PATENT DOCUMENTS

| | | | | |
|---|---|---|---|---|
| 7,373,223 | B2* | 5/2008 | Murphy | G01C 23/00 340/951 |
| 7,760,139 | B1* | 7/2010 | Gorski-Popiel | 342/357.36 |
| 8,035,558 | B2* | 10/2011 | Cohen et al. | 342/357.64 |
| 2002/0193108 | A1* | 12/2002 | Robinett | 455/427 |
| 2008/0068263 | A1* | 3/2008 | Tekawy et al. | 342/357.11 |
| 2011/0285590 | A1* | 11/2011 | Wellington | 342/417 |

* cited by examiner

APPLICATION OF GPS SIGNAL PROCESSING TO ATTITUDE DETERMINATION AND COMMUNICATION

FIELD OF THE INVENTION

The present invention relates to the field of navigation systems and particularly to the application of Global Positioning System (GPS) processing to attitude determination and communication.

BACKGROUND OF THE INVENTION

Currently, attitude determination for an aircraft, spacecraft, guided missile or the like is generally provided by an on-board Inertial Measurement Unit (IMU). However, implementing an on-board IMU for attitude determination may not be very efficient in terms of Size, Weight, Power and Cost (SWAP-C) considerations. Thus, it would be desirable to provide a system which obviates the above-referenced problems associated with the above-referenced current solutions.

SUMMARY OF THE INVENTION

Accordingly, an embodiment of the present invention is directed to a system for implementation on-board a mobile platform (ex.—a precision-guided weapon or munition), the system including: an antenna array, the antenna array being configured for receiving Radio Frequency signals, the Radio Frequency signals including at least one of: satellite navigation signals (ex.—GPS signals) and known location transmitter signals; a receiver, the receiver being connected to the antenna array, the receiver including a receiving unit, the receiving unit being configured for receiving Radio Frequency inputs from the antenna array, the Radio Frequency inputs including the received signals; a processor, the processor being connected to the receiving unit, the processor being configured for receiving the Radio Frequency inputs from the receiving unit, the processor being configured for processing the received signals; and a memory, the memory being connected to the processor, the memory storing initialization data for the platform, the initialization data including position data for the platform, velocity data for the platform and a heading of the platform, the position data, velocity data and heading corresponding to a first point in time, wherein the antenna array receives the signals at a second point in time, the second point in time being subsequent to the first point in time, the system determining an attitude of the platform corresponding to the second point in time based upon the processed signals and the initialization data.

An additional embodiment of the present invention is directed to a method for dynamically determining attitude of a mobile platform via a system implemented on-board the platform, the method including: providing initialization data for the platform from a memory of the system to a processor of the system, the initialization data including position data for the platform, velocity data for the platform, and a heading of the platform, the position data, velocity data and heading corresponding to a first point in time; receiving Radio Frequency signals via an antenna array of the system at a second point in time, the second point in time being subsequent to the first point in time; providing Radio Frequency inputs from the antenna array of the system to a receiving unit of the system, said Radio Frequency inputs including the received signals; providing the Radio Frequency inputs including the received signals from the receiving unit of the system to a processor of the system; processing said received signals via the processor of the system, wherein processing said received signals includes: sweeping the antenna array, locating signals of interest from the plurality of received signals during said sweeping of the antenna array, based on said locating of the signals of interest, and selectively amplifying the received signals to achieve a desired sensitivity pattern in a desired direction; based on the processed signals and initialization data, determining an attitude of the platform, via the processor, the attitude corresponding to the second point in time, wherein determining the attitude includes utilizing the initialization data, utilizing information obtained from the received signals and utilizing information associated with transmitters of the received signals to determine the attitude of the platform for the second point in time.

A further embodiment of the present invention is directed to a computer program product, including: a non-transitory computer-readable storage medium including computer-usable program code for performing a method for dynamically determining attitude of a mobile platform via a system implemented on-board the mobile platform, the computer program product including: computer-usable program code for providing initialization data for the mobile platform from a memory of the system to a processor of the system, the initialization data including position data for the platform, velocity data for the platform, and a heading of the platform, the position data, velocity data and initial heading corresponding to a first point in time; computer-usable program code for receiving Radio Frequency signals via an antenna array of the system at a second point in time, the second point in time being subsequent to the first point in time; computer-usable program code for providing Radio Frequency inputs from the antenna array of the system to a receiving unit of the system, said Radio Frequency inputs including the received signals; computer-usable program code for processing the received signals via the processor of the system; computer-usable program code for sweeping the antenna array and locating signals of interest from the plurality of received signals during said sweeping of the antenna array; computer-usable program code for, based on said locating of the signals of interest, selectively amplifying the received signals to achieve a desired sensitivity pattern in a desired direction; and computer-usable program code for, based on the processed signals and initialization data, determining an attitude of the platform, the attitude corresponding to the second point in time.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently, attitude determination for a vehicle (ex.—an aircraft, spacecraft, guided missile or the like) is generally provided by an on-board Inertial Measurement Unit (IMU). For example, for a vehicle implementing a GPS navigation system, once attitude is determined by the IMU, a signal processing technique known as beamforming may be implemented to digitally enhance antenna array gain in the direction of GPS satellites. However, implementing an on-board IMU for attitude determination may not be very efficient in terms of Size, Weight, Power and Cost (SWAP-C) considerations. The present invention provides an attitude determination solution which obviates the above-referenced problems associated with implementing an on-board IMU for attitude determination.

Figure 1:
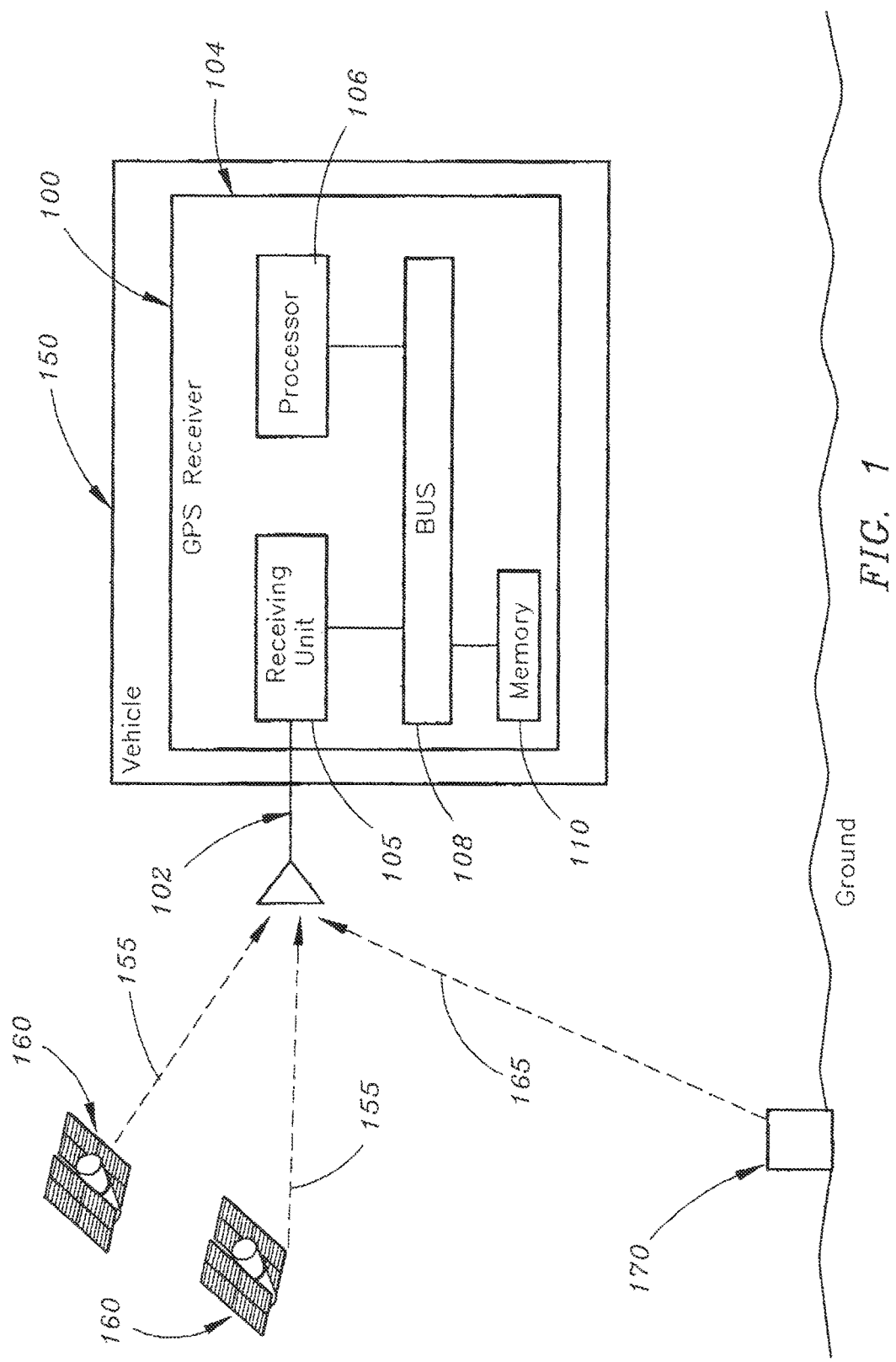
FIG. 1 is a block diagram schematic of a system for providing attitude determination for a mobile platform (ex.—precision-guided munition) in accordance with an exemplary embodiment of the present disclosure.

Referring to FIG. 1, a system in accordance with an embodiment of the present disclosure is shown. In an embodiment of the present disclosure, the system 100 is implemented on-board a platform (ex.—a mobile platform) or vehicle 150, such as a projectile, a precision-guided ordinance (ex.—munition), an aircraft (ex.—an Unmanned Aerial Vehicle), and/or a spacecraft. In an embodiment of the present disclosure, the system 100 may be a navigation (Nav) system, such as a Global Navigation Satellite Systems (GNSS) system (ex.—a GPS system). In a further embodiment of the present disclosure, the system 100 may be an integrated navigation and communication system (ex.—a Nav/Comm system).

In exemplary embodiments of the present disclosure, the system 100 includes an antenna array 102, the antenna array including one or more antenna(s), the antennas being established (ex.—spaced apart) in a known spatial orientation with respect to each other. In an embodiment of the present disclosure, the antenna array 102 may be a navigation antenna array, such as a GNSS antenna array (ex.—GPS antenna array). For instance, antennas of the navigation antenna array are configured for receiving signals, such as Radio Frequency signals, satellite signals (ex.—satellite navigation signals, satellite positioning signals). In a further embodiment of the present disclosure, the antenna array 102 may be an integrated navigation and communication antenna array (ex.—Nav/Comm antenna array). For instance, antennas of the integrated navigation and communication antenna array are configured for both transmitting and receiving signals. In still further embodiments of the present disclosure, the antennas of the antenna array 102 are connected to (ex.—are located on-board) the platform 150.

In an embodiment of the present disclosure, the system 100 includes a receiver 104. For instance, the receiver 104 may be implemented on-board the platform 150. The receiver 104 is connected to the antenna array 102 and is configured for receiving Radio Frequency (RF) inputs from the antenna array 102, the RF inputs including the received signals. For example, if the antenna array 102 is a Nav antenna array (ex.—a GPS antenna array), the receiver 104 is a GPS receiver configured for receiving RF inputs provided by GPS antennas. Further, if the antenna array 102 is a Nav/Comm antenna array, its corresponding receiver 104 is a transceiver (ex.—a Nav/Comm receiver) configured for receiving RF inputs from and providing RF outputs to Nav/Comm antennas. The receiver 104 of the system 100 may be configured for determining (ex.—dynamically determining) a position (ex.—an in-flight position, an in-flight attitude) of the platform 150 based on the received RF inputs from the antenna array 102. In an embodiment of the present invention, the receiver 104 includes a receiving unit 105, said receiving unit 105 configured for receiving the RF inputs provided by the antenna array 102

In exemplary embodiments of the present disclosure, the system 100 includes a processor 106. For instance, the processor 106 may be implemented on-board the platform 150 and may be implemented as part of the receiver 104. The processor 106 may be connected to the receiving unit 105 via an interface (ex.—bus) 108, said processor 106 and receiving unit 105 each being connected to the bus 108. The receiving unit 105 is configured for providing the received RF inputs to the processor 106. The processor 106 is configured for processing said RF inputs. The processing of said RF inputs by the processor 106 will be discussed in further detail below.

In an embodiment of the present disclosure, the system 100 includes a memory 110, said memory 110 being connected to the processor 106. Further, said memory 110 may be implemented as part of the receiver 104. For example, the memory 110 may be connected to the processor 106 via the bus 108.

Figure 2:
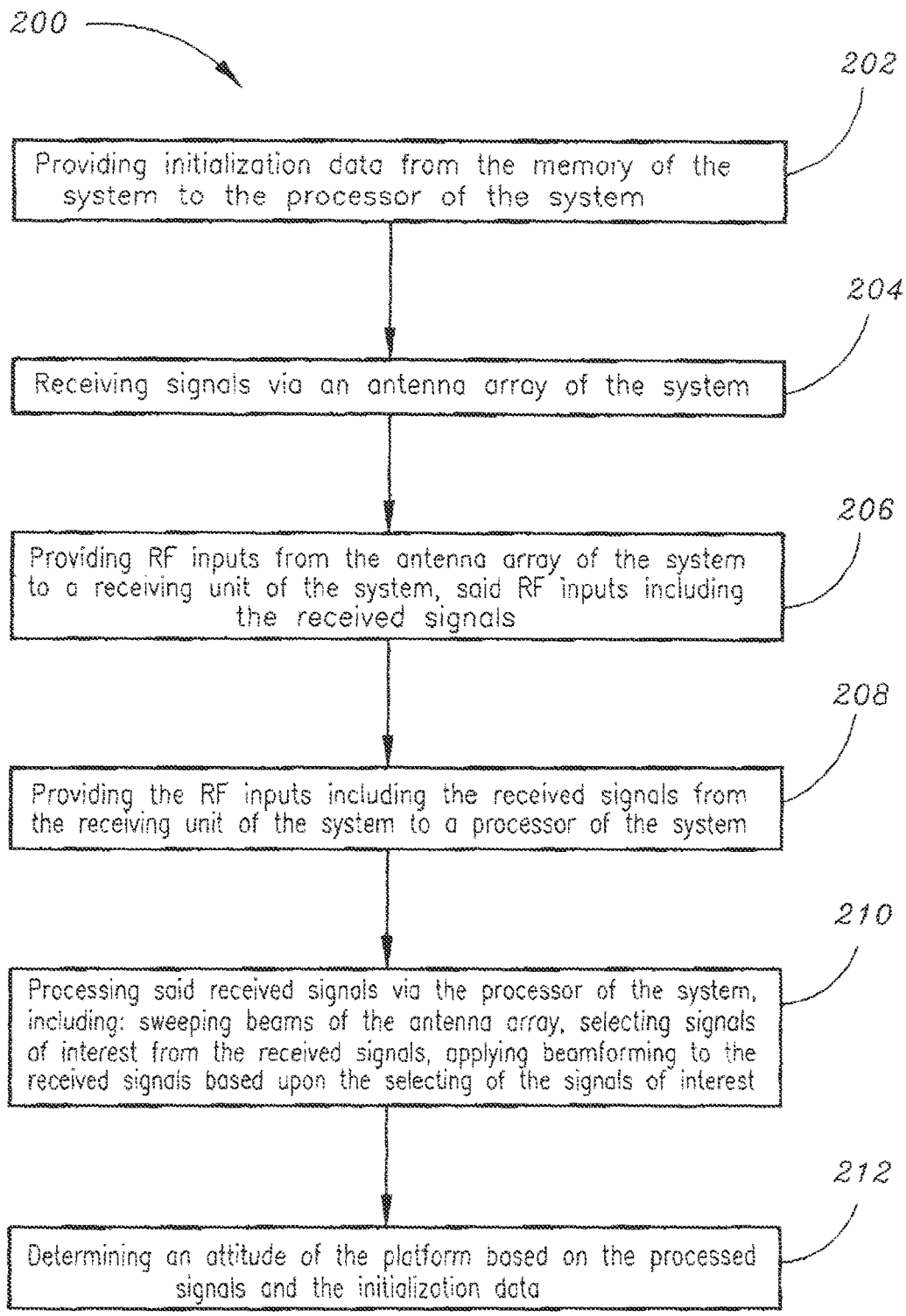
FIG. 2 is a flowchart illustrating a method for determining attitude of a mobile platform via the system shown in FIG. 1 in accordance with an exemplary embodiment of the present disclosure.

Referring to FIG. 2, a flow chart is shown which illustrates a method for determining attitude of a platform (ex.—vehicle) via a system (ex.—the system 100 shown in FIG. 1) in accordance with an exemplary embodiment of the present disclosure. For example, the method 200 shown in FIG. 2, allows for dynamic (ex.—in-flight) determination of an attitude of the platform 150 over time. In an exemplary embodiment, the method 200 includes the step of providing initialization data (ex.—a priori information, such as position data, velocity data, and/or heading data for the platform 150 corresponding to a first point in time) from the memory of the system to the processor of the system 202. For instance, the initialization data may include a known (ex.—previously determined) position, velocity and/or heading of the platform 150.

In an embodiment of the present invention, the method 200 further includes the step of receiving (ex.—acquiring) signals via an antenna array of the system 204. For instance, the signals received by the antennas of the antenna array 102 may include satellite signals 155 (ex.—GPS satellite signals, satellite radio navigation signals) transmitted from a plurality of satellites 160 (ex.—GPS satellites). Further, the signals received by the antenna array 102 may include friendly emitter signals 165 (ex.—signals of interest) received from emitters (ex.—radio towers, beacons, transmitters) which are established at known and/or fixed locations (ex.—FM broadcast signals, system beacon signals) 170. These emitters may be known as known location transmitters, said known location transmitters having a known or fixed location. The above-referenced receiving or acquisition of signals by the system 100 occurs at a second point in time, said second point in time being subsequent to the first point in time.

In an exemplary embodiment of the present invention, the method 200 further includes the step of providing RF inputs from the antenna array of the system to a receiving unit of the system, said RF inputs including the received signals 206.

In an embodiment of the present invention, the method 200 may include the step of providing the RF inputs including the received signals from the receiving unit of the system to a processor of the system 208. For instance, the RF inputs including the received signals (ex.—GPS signals) may be provided from the receiving unit 105 of the system 100 to the processor 106 of the system.

In still further embodiments, the method 200 may further include the step of processing said received signals via the processor of the system 210. During signal processing, the processor 106 sweeps the antenna array 102 (ex.—sweeps the beams (ex.—received signals) of the antenna array 102, monitors or analyzes each of the received signals from the antenna array) in a manner similar to a direction finding system, such that it may detect relative signal strengths of the received signals from the antennas of the array. Further, during said sweeping, the processor 106 determines which of the received signals are signals of interest. For example, signals of interest may include signals received from GPS satellites, higher power signals, signals received from friendly emitters, and/or signals received from known location emitters (i.e., known location transmitters) having a known (exs.—fixed, predetermined) location. Further, during signal processing, the processor implements a technique (ex.—beamforming), such that the signals received via the different antennas of the antenna array 102 are combined in such a manner as to observe a desired receive sensitivity pattern (ex.—to provide directional reception). This may be done by selectively amplifying the received signals by different weights in order to achieve (ex.—observe, obtain) a desired sensitivity pattern for the received signals. For example, signals which are determined by the processor 106 as being signals of interest may be amplified via different (ex.—greater) weights than signals included in the received signals which are not determined as being signals of interest (ex.—noise, jammer signals). The above-referenced signal processing techniques essentially allow for directional reception, in which one or more narrow beams of high gain are essentially generated for providing reception in a desired direction.

In exemplary embodiments of the present invention, the method 200 may further include the step of determining an attitude of the platform based on the processed signals and initialization data 212. For instance, during said signal processing, information may be obtained from the more highly amplified signals (ex—from the signals of interest), since it may be more accurate and/or useful for platform position determination than information that could be obtained from the non-signals of interest, and may be relied upon in determining an attitude of the platform 150. For example, the processor 106 may utilize the initialization data, information obtained from the received signals, known information associated with the GPS constellation, known information associated with friendly emitters, and/or known information associated with known location emitters (i.e. known location transmitters) to determine an attitude of the platform 150, said attitude corresponding to and/or being associated with the second point in time (ex.—the determined attitude being the attitude of the platform 150 at the second point in time) As described above, the system 100 may be configured for dynamically determining an attitude of the platform over (ex.—versus) time by following the above-referenced method 200. Further, the system 100 and method 200 described herein, allow for dynamic attitude determination of a platform without the need for an IMU, thereby promoting a reduction in SWAP-C attributes for the system. For instance, one or more steps of the above-referenced method 200 may be repeated over time for continuously updating an attitude of the platform 150 over time.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a non-transitory computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system comprising:
   a processor, an antenna and a memory, the processor coupled to the antenna, the memory and a mobile platform, the processor configured to:
   obtain a priori position data from the memory at a first point in time;
   receive a plurality of signals from one or more emitters at a second point in time, the plurality of signals comprising one or more signals with directional reception information, the one or more emitters comprising at least one fixed-location emitter and a plurality of transmitters, the plurality of transmitters comprising Global Positioning System (GPS) satellites;
   determine which of the one or more signals of the plurality of signals has the directional reception information;
   selectively amplify the one or more signals having the directional reception information; and
   determine an attitude of the mobile platform at approximately the second point in time based on the a priori position data, the directional reception information, known GPS constellation information for the GPS satellites, and known information associated with the at least one fixed-location emitter and the one or more signals selectively amplified.

2. The system of claim 1, wherein the antenna comprises an antenna array, the antenna array being connected to a receiver, the antenna array being configured for receiving the plurality of signals comprising Radio Frequency signals including at least one of: satellite navigation signals and ground based known location transmitter signals.

3. The system of claim 2, wherein the antenna array is a Global Positioning System antenna array and the satellite navigation signals are Global Positioning System signals.

4. The system of claim 2, wherein the antenna array is an integrated Navigation and Communication antenna array.

5. The system of claim 2, wherein the receiver is one of: a Global Positioning System receiver and an integrated Navigation and Communication receiver.

6. The system of claim 1, wherein the mobile platform is one of: a vehicle, a projectile, an aircraft, a precision-guided munition, and a spacecraft.

7. The system of claim 1, wherein the attitude is a first attitude, wherein the processor is further configured to determine a second attitude at a third point in time, and wherein at least two of the initialization data and the first point in time, the first attitude and the second point in time, and the second attitude and the third point in time are used to dynamically determine attitude of the mobile platform versus time.

8. A method, comprising:
  obtaining, by at least one processor, a prior position data of a mobile platform from non-transitory memory at a first point in time;
  receiving, by at least one antenna, a plurality of signals from one or more emitters at a second point in time, the plurality of signals comprising one or more signals with directional reception information, the one or more emitters comprising a fixed-location emitter and a plurality of transmitters, the plurality of transmitters comprising Global Positioning System (GPS) satellites;
  determining, by the at least one processor, which of the one or more signals of the plurality of signals has the directional reception information;
  selectively amplifying, by at least one processor, the one or more signals having the directional reception information; and
  determining, by the at least one processor, an attitude of the mobile platform at approximately the second point in time based on the a priori position data, the directional reception information, known GPS constellation information for the GPS satellites, and known information associated with the fixed-location emitter and the one or more signals selectively amplified.

9. The method of claim 8, further comprising processing said plurality of signals, wherein the at least one antenna comprises an antenna array and processing said plurality of signals comprises sweeping the antenna array.

10. The method of claim 9, wherein processing said received signals further comprises:
  locating signals of interest from the plurality of signals during said sweeping of the antenna array.

11. The method of claim 10, wherein the selectively amplifying, by the at least one processor, the one or more signals having the directional reception information is based on said locating of the signals of interest to achieve a desired sensitivity pattern in a desired direction.

12. The method of claim 11, wherein the a priori position data comprises initialization data, and wherein the method further comprises continuously updating the attitude of the platform over time without the use of an inertial measurement unit (IMU).

13. The method of claim 12, wherein the platform comprises a precision-guided munition, and wherein the plurality of transmitters further comprise at least one of: radio towers and beacons.

14. The method of claim 12, further comprising combining the plurality of received signals according to a beamforming process, wherein results of the beamforming process comprise the selectively amplifying, by the at least one processor, the one or more signals having the directional reception information.

15. A computer package, comprising:
  a non-transitory processor-readable medium configured for communicative coupling with a processor and an antenna of a mobile-based platform, the non-transitory processor-readable medium comprising instructions, which when executed, cause the processor to perform steps comprising:
  obtain a priori position data at a first point in time;
  receive a plurality of signals from one or more emitters at a second point in time, the plurality of signals comprising one or more signals with directional reception information, the one or more emitters comprising at least one fixed-location emitter and a plurality of transmitters, the plurality of transmitters comprising Global Positioning System (GPS) satellites;
  determine which of the one or more signals of the plurality of signals has the directional reception information;
  selectively amplify the one or more signals having the directional reception information; and
  determine an attitude of the platform at approximately the second point in time based on the a priori position data, the directional reception information, known GPS constellation information for the GPS satellites, and known information associated with the at least one fixed-location emitter and the one or more signals selectively amplified.

16. The computer package of claim 15, wherein the antenna comprises an antenna array, and wherein the processor is configured to determine which of the one or more signals of the plurality of signals has the directional reception information by sweeping the antenna array and locating signals of interest from the plurality of received signals during said sweeping of the antenna array.

17. The computer package of claim 16, wherein the processor is configured to selectively amplify the one or more signals having the directional reception information based on the locating signals of interest.

18. The computer package of claim 17,
  wherein the directional reception information is first directional reception information,
  wherein the a priori data comprises initialization data, the initialization data comprises position data for the platform, velocity data for the platform, and a heading of the platform, the a priori data corresponding to the first point in time, and
  wherein the processor is further configured to utilize the initialization data, utilize second directional reception information, and utilize known information associated with the fixed-location emitter and the one or more signals selectively amplified to determine a second attitude at a third point in time.

19. The computer package of claim 18, wherein the fixed-location emitter is a single emitter having a predetermined location or a constellation of GPS satellites with known information about the GPS satellites, wherein the known information about the GPS satellites comprises a known trajectory, and wherein the mobile-based platform is a precision-guided munition.

20. The computer package of claim 15, wherein the a priori data comprises initialization data including position data for the mobile-based platform, velocity data for the mobile-based platform, and a heading of the mobile-based platform, and wherein a) the initialization data and the first point in time, and b) the attitude and the second point in time are used to determine mobile-based platform attitude versus time.

21. The computer package of claim 15, wherein the attitude is a first attitude, and wherein the processor is further configured to utilize the a priori data, utilize the directional reception information, utilize the known information associated with the at least one fixed-location emitter and the one or more signals selectively amplified, and utilize the known GPS constellation information for the GPS satellites to determine a second attitude.

* * * * *